Sept. 15, 1970
C. F. BLINNE
3,528,255
APPARATUS FOR LAYING PLASTIC PIPE
Filed Dec. 12, 1967
2 Sheets-Sheet 1
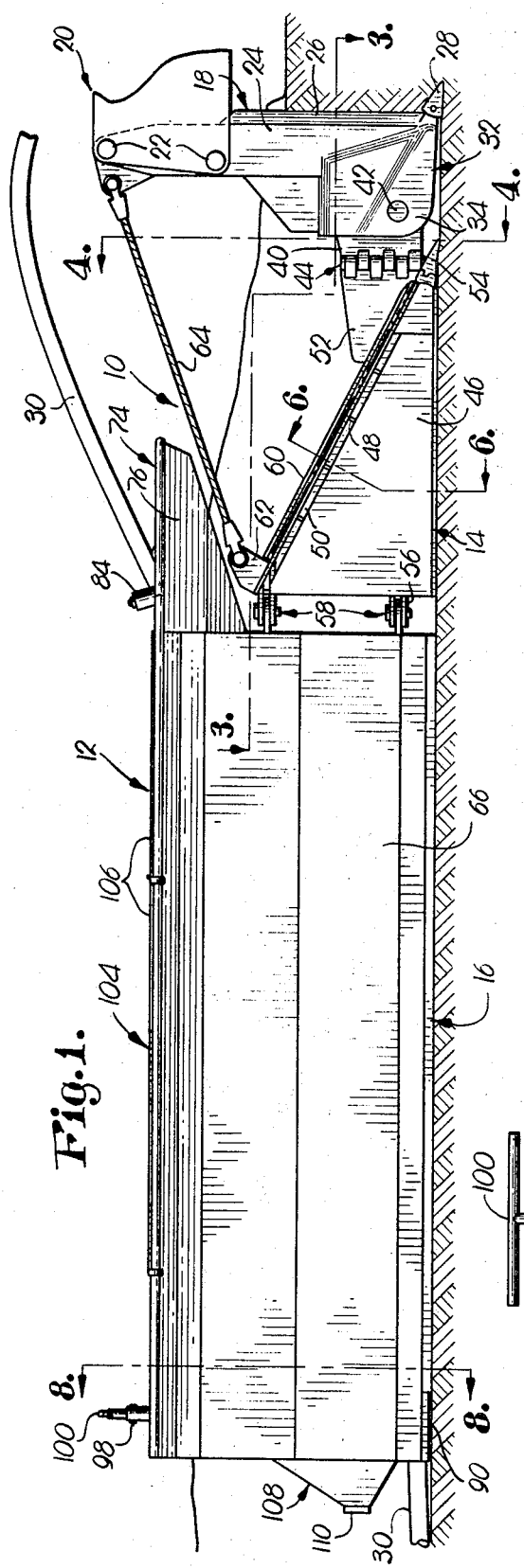
INVENTOR
Charles F. Blinne
BY Schmidt, Johnson, Hovey,
Williams & Bradley,
ATTORNEYS.

Sept. 15, 1970  C. F. BLINNE  3,528,255
APPARATUS FOR LAYING PLASTIC PIPE
Filed Dec. 12, 1967  2 Sheets-Sheet 2
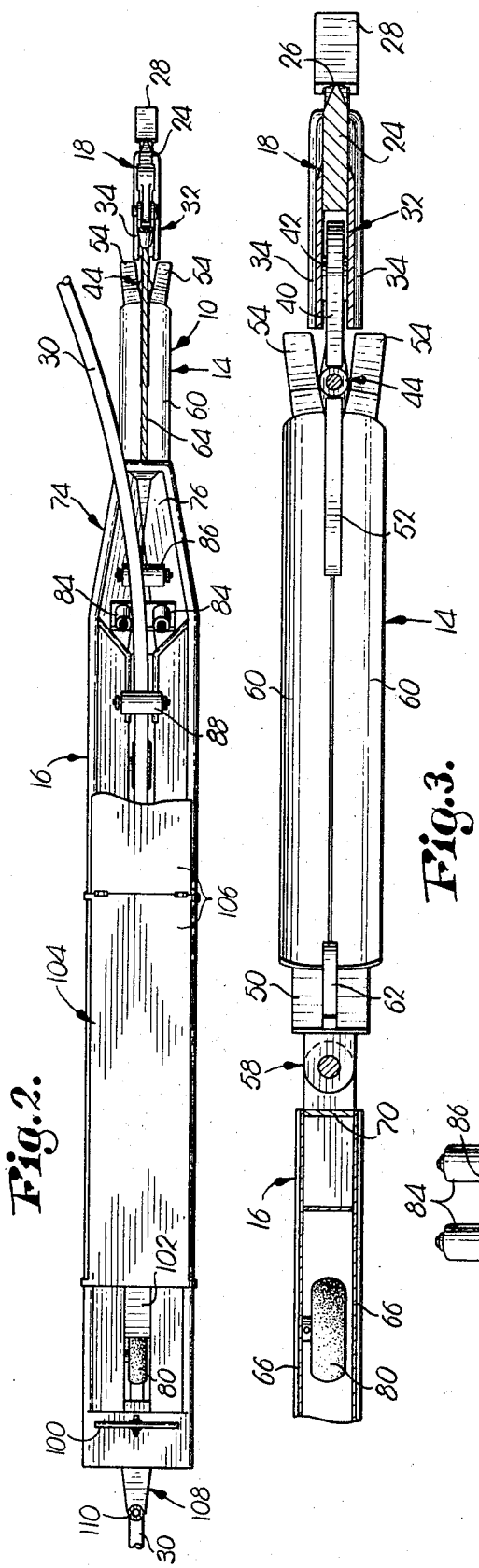
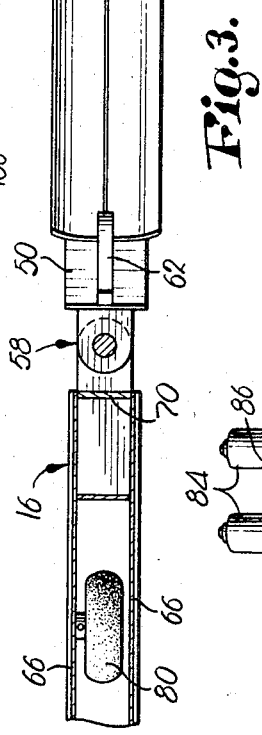
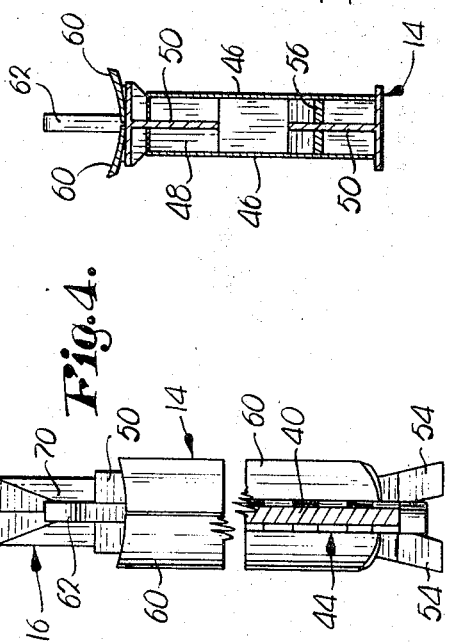
INVENTOR
Charles F. Blinne
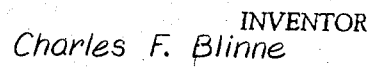
BY
ATTORNEYS.

United States Patent Office 3,528,255
Patented Sept. 15, 1970

3,528,255
APPARATUS FOR LAYING PLASTIC PIPE
Charles F. Blinne, P.O. Box 445,
Poplar Bluff, Mo. 63901
Filed Dec. 12, 1967, Ser. No. 689,962
Int. Cl. F16l 1/00; E02f 5/18
U.S. Cl. 61—72.6
6 Claims

ABSTRACT OF THE DISCLOSURE

A plow for forming a ditch and installing an elongated element in the ditch. A socket on the ground breaking shank houses a connector extending between the plow and the shank to shield against dirt and to permit relative movement between the plow and shank about a pair of axes. The plow comprises a ditch widening section and a ditch maintaining and element guiding section. Inclined vanes on the widening section conduct loosened material upwardly whereupon the material encounters a deflector on the maintaining section for moving the dirt to the edges of the ditch as the element is conducted down along a curved track into the bottom of the ditch. An adjustable hold-down roller near the end of the track is disposed to engage the element to insure proper positioning in the ditch.

---

This invention relates to apparatus for laying an elongated element such as plastic pipe or the like and, more particularly, to apparatus for forming the ditch and laying the element as the apparatus is moved through the ground.

It has been found that plastic pipe can be successfully and economically installed in the ground simultaneously with the formation of the ditch in the ground. A ground-breaking shank is pulled through the soil by a prime mover and a ditch forming and pipe laying plow is coupled with the shank to follow the latter for completing the pipe laying operation. Usually, separate equipment such as bulldozers or the like follow to close the ditch over the pipe.

Apparatus of the type described must comprise a relatively long train to first form an adequate ditch and then conduct the pipe along a curve which extends over a great enough distance to avoid the imparting of breaking stresses to the pipe. The length of the apparatus and the fact that it must be disposed within the relatively narrow confines of the ditch has presented problems in turning the apparatus to follow curves in the desired path of the pipeline. These curves may proceed in a lateral direction or they may result from vertical deviations because of the uneven terrain encountered in laying the pipeline.

Accordingly, it is the primary object of the instant invention to provide apparatus of this type which is capable of flexing to permit vertical and lateral movement simultaneously intermediate its ends.

Another very important object of this invention is to provide a novel socket and connector coupling between the plow and the ground-breaking shank to shield the connection from debris and thereby insuring freedom of the components for shifting relative to one another as may be required during the pipe laying operation.

A further object of the present invention is to provide apparatus equipped with structure for removing material from the ditch to form and widen the same, avoiding compacting the material in the ditch, and thereby minimizing the power requirements for the pipe laying operation.

Still another object of the instant invention is to provide an adjustable hold-down at the rear of the pipe laying track so that the positioning of the pipe in the ditch may be accurately controlled.

Yet another object of the invention is to provide a novel cover structure for the plow to provide a space for workmen to stand, yet which also provides access to the interior of the plow as may be required during the pipe laying operation.

These and other important objects of the invention will be further explained or will become apparent in the specification and drawings.

In the drawings:

FIG. 1 is a side elevational view of apparatus embodying the principles of this invention illustrating the apparatus in typical pipe laying position, a portion of the prime mover appearing fragmentarily;

FIG. 2 is a top plan view thereof, parts being broken away for clarity;

FIG. 3 is an enlarged, fragmentary, cross-sectional view taken along irregular line 3–3 of FIG. 1;

FIG. 4 is an enlarged, fragmentary, cross-sectional view taken along line 4–4 of FIG. 1;

FIG. 5 is an enlarged, fragmentary, side elevational view of the shank, coupler and leading section of the plow, parts being broken away and shown in cross section to reveal details of construction;

FIG. 6 is an enlarged cross-sectional view taken along irregular line 6–6 of FIG. 1;

FIG. 7 is a fragmentary, vertical cross-sectional view through the plow; and

FIG. 8 is an enlarged, fragmentary cross-sectional view taken along line 8–8 of FIG. 1.

Apparatus embodying the principles of this invention is designated in the drawings by the reference numeral 10 and includes a plow 12 comprised of a leading ditch-forming section 14 and a trailing ditch maintaining and pipe laying section 16. Leading section 14 is adapted to be coupled to a vertically extending shank 18 which is mounted on the adjustable hitch 20 of a prime mover (not shown) which may be a crawler tractor or the like. Shank 18 is secured to hitch 20 by pins 22 and includes a standard 24 provided with a sharpened leading edge 26 adapted to cut through and loosen rock, soil or the like as apparatus 10 is moved forwardly through the ground. The lower leading edge of shank 18 is equipped with a projecting tooth 28 disposed to chisel through the soil to the depth desired for the ditch in which an elongated element such as a plastic pipe 30 is to be installed. Thus, tooth 28 proceeds along a path of travel which defines the floor of the ditch for pipe 30.

Rigidly secured to the rear of standard 24 as by welding or the like is a socket 32 defined by a pair of spaced-apart sidewalls 34, a top wall 36 and a bottom wall 38 as illustrated best in FIG. 5. Thus, socket 32 is open toward the rear and a rigid, plate-like connector 40 is partially received within socket 32. A pin 42 has opposed ends received in respective sidewalls 34 and passes through an opening in connector 40 for pivotally coupling the latter to socket 32 for relative swinging movement about a horizontal axis defined by pin 42. The leading end of plow section 14 is swingably coupled to connector 40 by hinge means 44 carried by section 14 and connector 40 respectively to permit relative swinging between the connector and the plow section about an upright axis.

Section 14 comprises a pair of spaced-apart plates 46 closed at the upper and lower edges and interconnected with supporting ribs 48 for adding structural rigidity to section 14. Ribs 50 extending perpendicular to ribs 48 further serve to brace plates 46 and insure that section 14 is structurally capable of taking the stresses which are imparted thereto during operation of apparatus 10 as will be subsequently explained. A hitch plate 52 welded to the leading end of section 14 intermediate a pair of spaced-apart teeth 54 is also rigidly secured to a longitudinally extending hitch member 56 which extends through section 14 and projects rearwardly thereof for intercoupling section 14 with section 16. The sections 14 and 16 are thus swingably interconnected by hinges 58 which are vertically aligned to permit swinging movement between the sections about an upright axis.

Vanes 60 at either side of the upper inclined surface of section 14 extend rearwardly and upwardly from the respective teeth 54 as illustrated in FIGS. 1, 3 and 4. Vanes 60 are disposed to conduct material engaged by teeth 54 and loosened by shank 18 upwardly and rearwardly toward the uppermost region of the ditch. The vanes 60 serve to widen the ditch by conducting such loosened material toward the top of the ditch.

An upwardly extending lug 62 mounted on section 14 is secured to a cable 64 which is, in turn, fastened to the prime mover hitch 20 whereby movement of the hitch may be utilized for raising or lowering apparatus 10 as will be understood by those skilled in the art.

Section 16 includes a pair of generally rectangular, spaced-apart side plates 66 which are interconnected by a bottom plate 68, a front plate 70, and a rear plate 72 to define a substantially open top, box-like structure received within the ditch formed by shank 18 and leading section 14. The spaced-apart side plates 66 serve to hold the material from filling the ditch and also mount guiding structure hereinafter to be described, which conducts the pipe 30 into its proper position on the floor of the ditch.

A forwardly projecting, irregularly shaped deflector structure 74 is mounted on section 16 in overlying relationship to the upper rear end of leading section 14 and includes a pair of sides 76 which are inclined upwardly and outwardly in opposite directions as illustrated best in FIG. 4. It will be noted that sides 76 are somewhat irregular and converge into an upwardly inclined end 78. Sides 76 serve as deflectors for material which is conducted upwardly and rearwardly along the vanes 60 to direct such material further upwardly and outwardly for disposition along the opposite edges of the ditch. Deflector structure 74 is integral with side plates 66 of the trailing section 16 whereby such material as is deposited at the ditch edges is held by plates 66 from gravitation back into the ditch until such time as the pipe 30 has been laid into the ditch bottom.

A plurality of rollers 80 which are preferably constructed from partially resilient material are mounted on one of the plates 66 as illustrated in FIGS. 3 and 7 to define an elongated, generally curvilinear track 82 from the uppermost front corner of rear section 16 to the lowermost rear corner of the latter. A pair of upwardly extending, spaced-apart rollers 84 and horizontally extending rollers 86 and 88 define therebetween the mouth of track 82 into which the plastic pipe 30 is fed for movement along track 82 to an outlet opening 90 at the lowermost rear end of section 16. Manifestly, rollers 84 may be mounted for adjustment toward or away from one another to accommodate pipes of varying diameters.

Hold-down means in the nature of a vertically adjustable roller assembly 92 is carried at the rear end of section 16 and includes a roller 94 mounted on an upright 96 secured to rear plate 72 of section 16 by adjustment means in the nature of a bolt 98. A T-shaped handle 100 facilitates upward or downward movement of roller 94 as may be desired. A plurality of webs 102 extend between side plates 66 of section 16 for interconnecting the latter to impart structural rigidity to the section. Further, it will be noted that bottom plate 68 is reinforced to minimize the deterioration of apparatus 10 from wear and erosion as apparatus 10 is moved through the soil.

A top cover 104 comprising a pair of sections 106 is disposed in covering relationship on plow section 16. The sections 106 are hingedly interconnected whereby one of the sections 106 may be swung upwardly to permit access to the interior of section 16. Normally, however, the cover plate 104 remains in place as illustrated in the drawings to provide a platform for a workman to stand during operation of the apparatus.

Outwardly projecting structure 108 at the rear of section 16 includes a vertically extending socket 110 which may be utilized for mounting a road wheel (not shown) for moving apparatus 10 from one location to another. Further, it is contemplated that it may be desirable to mount a sand hopper (not shown) on projection 108 for partially enclosing pipe 30 in sand or similar material after the latter has been laid in the ditch and before the ditch has been closed.

In operation, the forward movement of shank 18 through the soil cuts and chisels the earth, rock and the like for loosening the same to the desired depth for the ditch. Movement of plow section 14 immediately therebehind elevates the loosened material along vanes 60 and removes such material from the ditch to widen the same to the desired width. It should be noted that vanes 60 project outwardly beyond the side plates 66 of the trailing section 16 as illustrated best in FIGS. 3 and 4. This minimizes the power requirements necessary for pulling the trailing section 16 along the ditch and also permits manipulation of the apparatus along a curved path of travel while the apparatus is in its pipe-laying position in the ditch.

Connector 40 between shank 18 and leading section 14 of the plow permits both up and down, as well as sidewise flexing between the components, to accommodate for vertical and lateral deviations in the path of travel. The socket construction heretofore described partially shields connector 40 from any dirt which might otherwise inhibit the free swinging movement of connector 40 with respect to shank 18. The vertical adjustment of roller 94 permits the use of apparatus 10 for installing a pipe of any diameter and serves to hold the pipe down into the bottom of the ditch at the point where debris and material is permitted to drop back into the ditch. Thus, any tendency of the pipe to rise which would permit such material to fall beneath the pipe, is resisted until the pipe is partially covered by such material.

The rollers 80 are positioned to guide the pipe along a path of travel which prevents overstressing of the pipe that could result in breakage thereof. It is contemplated that the interior of plow section 16 may, if desired, be provided with heating means 112 for heating the interior of the section to permit movement of plastic pipe along the curvilinear path defined by track 82 during cold weather. It is, of course, important that the stresses imparted to the pipe not exceed the bending tolerance characteristics of the latter during the laying operation. Further, it is important that the workmen have access to the interior of plow section 16 for observing the pipe during the laying operation to detect any fractures which might occur to the pipe whereby the fractures may be repaired before the pipe is buried in the ground.

Having thus described the invention, what is claimed as new and desired to be secured by Letters Patent is:

1. Apparatus for installing an elongated element in a ditch including an elongated, ditch-forming plow adapted to be coupled with a ground-breaking shank, said apparatus comprising:
   a socket adapted to be rigidly connected to the shank and including a pair of spaced sidewalls, the trailing end of said socket being open;
   a rigid connector extending into said socket between said sidewalls;
   pin means interconnecting the connector with said sidewalls of the socket for pivotal movement of the connector with respect to the socket and about a horizontal axis; and
   hinge means between the connector and the leading end of said plow for coupling the plow to the connector for relative swinging movement about an upright axis, whereby the plow may follow the contour of the ground broken by the shank despite lateral and vertical deviations in the directon of movement of the shank through the soil, said plow including a pair of spaced teeth disposed outwardly from and on opposite sides of the path of travel of said shank and an upwardly and rearwardly inclined vane for each tooth respectively, said teeth and vanes cooperating to conduct material loosened by the shank upwardly toward the surface of the ground as the apparatus is moved forwardly through the ground, whereby to form said ditch, said plow including a leading section and a trailing section, and hinge means interconnecting said sections for relative swinging movement with respect to one another about an upright axis, whereby to facilitate movement of said plow through a relatively narrow ditch despite lateral deviations in the direction of said ditch.

2. Apparatus as set forth in claim 1, wherein said trailing section includes a pair of elongated, spaced-apart side plates, and a plurality of guide structures between the side plates to define an elongated track for said element, said track extending rearwardly and downwardly of said trailing section along a predetermined path selected consistent with the bending tolerance characteristics of said element, and vertically adjustable hold-down means carried by the trailing section proximal the rear end of the track and disposed to engage the element as the latter is fed along said track when the apparatus is moved forwardly through the ground.

3. Apparatus as set forth in claim 2, wherein said guide structures include a plurality of spaced-apart rollers mounted on at least one of said side plates.

4. Apparatus as set forth in claim 2, wherein said hold-down means includes a roller, and means adjustably mounting said roller on said trailing section for vertical shifting movement with respect to said track.

5. Apparatus as set forth in claim 2, wherein is included a top cover for said trailing section and spanning the distance between said side plates, said top cover comprising a plurality of portions, at least one of said portions of the top cover being removably mounted on said side plates to permit access to said track.

6. Apparatus for installing an elongated element in a ditch including an elongated, ditch-forming plow adapted to be coupled with a ground-breaking shank, said apparatus comprising:

a socket adapted to be rigidly connected to the shank and including a pair of spaced sidewalls, the trailing end of said socket being open;

a rigid connector extending into said socket between said sidewalls;

pin means interconnecting the connector with said sidewalls of the socket for pivotal movement of the connector with respect to the socket and about a horizontal axis; and hinge means between the connector and the leading end of said plow for coupling the plow to the connector for relative swinging movement about an upright axis, whereby the plow may follow the contour of the ground broken by the shank despite lateral deviations in the direction of movement of the shank through the soil, said plow including a pair of spaced teeth disposed outwardly from and on opposite sides of the path of travel of said shank and an upwardly and rearwardly inclined vane for each tooth respectively, said teeth and vanes cooperating to conduct material loosened by the shank upwardly toward the surface of the ground as the apparatus is moved forwardly through the ground, whereby to form said ditch, said plow including deflector means disposed above the uppermost ends of said vanes, said deflector means including oppositely directed portions for deflecting said material outwardly toward either side of the ditch, said plow including a trailing section having a pair of elongated, spaced-apart side plates, said deflector means being carried at the forwardmost end of said side plates whereby the latter hold the material out of said ditch after the material has been deflected to the edges of the ditch.

References Cited

UNITED STATES PATENTS

| 2,648,919 | 8/1953 | Brown | 37—98 |
| 3,313,115 | 4/1967 | Kniefel | 61—72.6 |

FOREIGN PATENTS 372,515   5/1932   Great Britain.

JACOB SHAPIRO, Primary Examiner

U.S. Cl. X.R.

37—98, 193; 172—613